(12) United States Patent
Ravinoothala et al.

(10) Patent No.: US 9,686,178 B2
(45) Date of Patent: Jun. 20, 2017

(54) CONFIGURING LINK AGGREGATION GROUPS TO PERFORM LOAD BALANCING IN A VIRTUAL ENVIRONMENT

(71) Applicant: VMware, Inc., Palo Alto, CA (US)

(72) Inventors: Sreeram Ravinoothala, San Jose, CA (US); Serge Maskalik, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 277 days.

(21) Appl. No.: 13/947,934

(22) Filed: Jul. 22, 2013

(65) Prior Publication Data
US 2015/0026344 A1    Jan. 22, 2015

(51) Int. Cl.
| | | |
|---|---|---|
| *H04L 12/709* | (2013.01) | |
| *H04L 12/803* | (2013.01) | |
| *H04L 12/713* | (2013.01) | |
| *H04L 12/931* | (2013.01) | |
| *H04L 12/935* | (2013.01) | |
| *H04L 12/823* | (2013.01) | |

(52) U.S. Cl.
CPC .......... *H04L 45/245* (2013.01); *H04L 45/586* (2013.01); *H04L 47/125* (2013.01); *H04L 49/30* (2013.01); *H04L 49/70* (2013.01); *H04L 47/32* (2013.01); *Y02B 60/33* (2013.01)

(58) Field of Classification Search
CPC ....... H04L 47/125; H04L 47/32; H04L 49/70; H04L 49/30; H04L 47/10; H04L 45/586; H04L 45/245
See application file for complete search history.

(56) References Cited

U.S. PATENT DOCUMENTS

| | | | | |
|---|---|---|---|---|
| 7,478,173 B1 * | 1/2009 | Delco | ................... | H04L 61/103 709/250 |
| 9,037,719 B2 * | 5/2015 | Shen | ................... | G06F 9/45558 709/226 |
| 9,350,666 B2 * | 5/2016 | Ravinoothala | ........ | H04L 45/245 |
| 9,477,524 B2 * | 10/2016 | Kang | ......................... | G06F 9/50 |
| 9,509,615 B2 * | 11/2016 | Ravinoothala | ........ | H04L 45/245 |
| 9,537,798 B1 * | 1/2017 | Devilbiss | .............. | H04L 45/245 |

(Continued)

OTHER PUBLICATIONS

Non-Final Office Action for U.S. Appl. No. 13/947,952, mailed Feb. 12, 2016, 13 pages.

(Continued)

*Primary Examiner* — Ramy M Osman
(74) *Attorney, Agent, or Firm* — Nicholson De Vos Webster & Elliott LLP

(57) ABSTRACT

Exemplary methods, apparatuses, and systems configure a first set of ports of a host device to be included within a link aggregation group (LAG) with a switch coupled to the first set of one or more ports. A second set of one or more ports of a second host device is also included within the LAG. The configuration of the LAG includes the switch performing load balancing between ports within the LAG. The first host device receives, via the LAG, a packet to be processed by a service implemented by each of one or more virtual machines running on the first host device. The first host device receives the packet as a result of the switch selecting a port within the first and second sets of ports based upon the load balancing between uplinks to the ports within the LAG.

17 Claims, 9 Drawing Sheets

(56) References Cited

U.S. PATENT DOCUMENTS

| | | | |
|---|---|---|---|
| 2010/0257269 A1* | 10/2010 | Clark | G06F 9/4856 709/226 |
| 2011/0010515 A1 | 1/2011 | Ranade | |
| 2011/0182289 A1 | 7/2011 | Raman | |
| 2011/0292931 A1* | 12/2011 | Kizawa | H04L 45/586 370/354 |
| 2012/0087372 A1* | 4/2012 | Narasimhan | H04L 45/245 370/392 |
| 2012/0210416 A1* | 8/2012 | Mihelich | H04L 63/0218 726/11 |
| 2012/0275297 A1* | 11/2012 | Subramanian | H04L 45/245 370/225 |
| 2012/0287939 A1* | 11/2012 | Leu | H04L 49/70 370/409 |
| 2013/0019014 A1* | 1/2013 | Johnsen | H04L 12/1863 709/225 |
| 2013/0136126 A1 | 5/2013 | Wang et al. | |
| 2013/0308647 A1* | 11/2013 | Rosset | H04L 12/4641 370/395.53 |
| 2013/0336337 A1 | 12/2013 | Gopinath et al. | |
| 2014/0036924 A1* | 2/2014 | Christenson | H04L 12/4641 370/395.53 |
| 2014/0307540 A1 | 10/2014 | Duda et al. | |
| 2014/0307553 A1* | 10/2014 | Fung | H04L 45/245 370/235 |
| 2014/0351443 A1* | 11/2014 | Tang | H04L 49/70 709/226 |
| 2014/0365680 A1* | 12/2014 | van Bemmel | H04L 29/06 709/232 |
| 2015/0026321 A1* | 1/2015 | Ravinoothala | H04L 45/245 709/222 |
| 2015/0026344 A1* | 1/2015 | Ravinoothala | H04L 45/245 709/226 |
| 2015/0026345 A1* | 1/2015 | Ravinoothala | H04L 45/245 709/226 |
| 2015/0029848 A1* | 1/2015 | Jain | H04L 47/125 370/235 |
| 2015/0172190 A1 | 6/2015 | Song | |
| 2017/0019369 A1* | 1/2017 | Ravinoothala | H04L 47/125 |
| 2017/0019370 A1* | 1/2017 | Ravinoothala | H04L 47/125 |

OTHER PUBLICATIONS

Non-Final Office Action for U.S. Appl. No. 13/947,971, mailed Jul. 2, 2015, 49 pages.
Non-Final Office Action for U.S. Appl. No. 14/181,526, mailed Oct. 8, 2015, 18 pages.
Notice of Allowance for U.S. Appl. No. 13/947,971, mailed Jan. 11, 2016, 24 pages.
Non-Final Office Action for U.S. Appl. No. 14/181,526, mailed Aug. 2, 2016, 46 pages.
Notice of Allowance for U.S. Appl. No. 13/947952, mailed Jul. 29, 2016, 19 pages.

* cited by examiner

CONFIGURING LINK AGGREGATION GROUPS TO PERFORM LOAD BALANCING IN A VIRTUAL ENVIRONMENT

FIELD OF THE INVENTION

The various embodiments described herein relate to managing link aggregation traffic in a virtual environment. In particular, the embodiments relate to load balancing traffic among and managing traffic between host devices that share one or more link aggregation groups.

BACKGROUND OF THE INVENTION

Load balancing distributes workload across multiple physical or virtual machines. In a virtualized datacenter environment, a load balancer may be implemented by a virtual machine running on one of multiple host devices. For example, one virtual machine may provide load balancing for a tenant within the datacenter. As each packet is received, the virtual load balancer selects one of multiple physical or virtual machines to perform a service on the packet. If, for example, the packet is a request for a web server, the virtual load balancer uses a load balancing algorithm to select one of the multiple physical or virtual machines implementing the web server. The packet, however, traverses a path from a switch or router, through a virtualization software layer within a host device, to the virtual load balancer, and, upon selection of a web server, back to the virtualization software layer and on to the web server, which may be within the same host device or external to the host device. Additionally, some load balancing solutions will route responses from the web server back through the virtual load balancer before the response is forwarded to the device that transmitted the original request for the web server. All requests, and possibly some or all responses, therefore pass through the virtual load balancer. The virtual load balancer, therefore, is a choke point for network throughput.

SUMMARY OF THE INVENTION

Exemplary methods, apparatuses, and systems configure a first set of ports of a host device to be included within a link aggregation group (LAG) with a switch or router (for simplicity of description, collectively referred to herein as "switch") coupled to the first set of one or more ports. A second set of one or more ports of a second host device is also included within the LAG. The configuration of the LAG results in the switch performing load balancing between ports within the LAG. For example, when the first host device receives, via the LAG, a packet to be processed by a service implemented by a virtual machine running on the first host device, the first host device receives the packet as a result of the switch selecting a port within the first and second sets of ports based upon the load balancing between the ports within the LAG. Each of the first and second host devices includes at least one virtual machine assigned to the LAG and able to process the packets received via the LAG. For example, a host device may have multiple virtual machines implementing a web server for a web site. Each of the first and second host devices would have a web server virtual machine assigned to the LAG to receive packets transmitted by the switch according to the load balancing algorithm of the LAG. This configuration enables the switch to perform load balancing between host devices, and therefore the virtual machines running on respective host devices.

Additionally, in one embodiment, a host device includes multiple virtual machines assigned to the LAG and able to process the packets (e.g., multiple web server virtual machines). In such an embodiment, the host further performs internal load balancing between the multiple virtual machines. In a further embodiment, the internal load balancing is performed at the virtualization software level rather than by a virtual machine.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein perform load balancing traffic among virtual machines (VM's) within a single link aggregation group (LAG). Physical ports across multiple host devices are configured to be included within a LAG. As a result of the configuration of the LAG, the switch performs load balancing between host devices, and, therefore, VM's corresponding to the host devices. Additionally, each host device may include multiple VM's providing a service for received packets. In such an embodiment, the host device implements internal load balancing between the multiple VM's. The performance of load balancing is distributed, externally and internally, among the switch and multiple host devices. This distributed load balancing replaces at least some functionality performed by the virtual load balancer described above, thereby reducing the negative effects of a single choke point in a virtual machine.

Embodiments described here further manage traffic between host devices that share one or more LAG's. For example, if a first host device and a second host device both have ports assigned to a single LAG, a first VM within the first host device will not be able to both transmit packets to and receive packets from a second VM within the second host device via the same LAG. Additionally, the load balancing that results from the LAG configuration may complicate sending a packet directly to a particular host device. Accordingly, first and second host devices that share at least one LAG may utilize separate synchronization ports (excluded from the shared LAG(s)) to transmit traffic between VM's on the first and second host devices.

Figure 1:
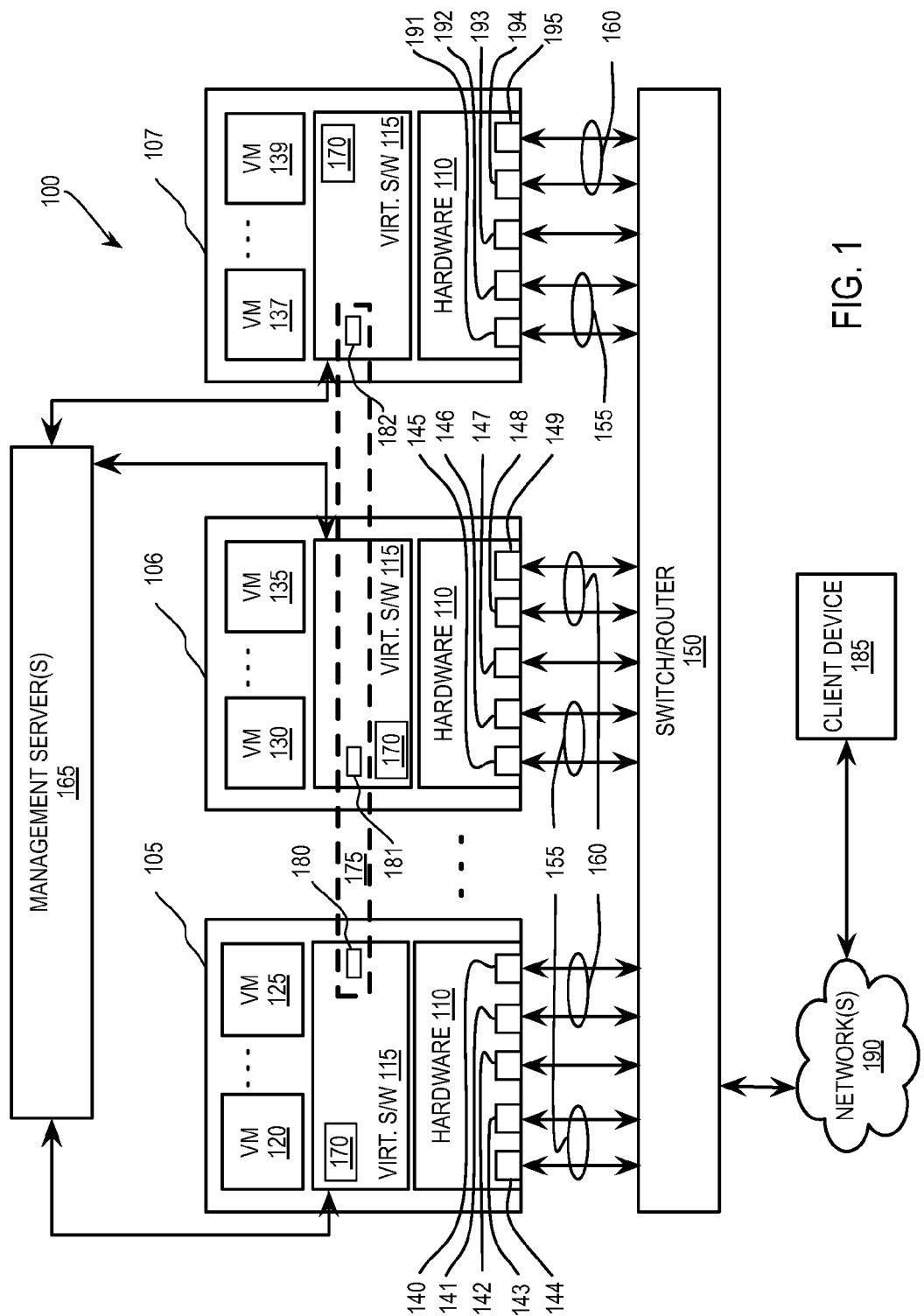
FIG. 1 illustrates, in block diagram form, an exemplary virtualized datacenter to perform load balancing traffic among and managing traffic between host devices that share one or more link aggregation groups.

FIG. 1 illustrates, in block diagram form, an exemplary virtualized datacenter 100 to perform load balancing traffic among and managing traffic between host devices that share one or more LAG's. Server-based computing in a virtualized datacenter 100 environment allows client device(s) 185 to access centrally-managed virtual desktops and network services, such as those implemented by VM's 120-139, via network(s) 190 (e.g., a local area network or other private or publically accessible wide area network, such as the Internet).

Virtualized datacenter 100 includes multiple physical computers (host devices) 105-107. Each host device 105-107 includes a plurality of VM's 120-139. VM's 120-139 are complete computation environments, containing virtual equivalents of the hardware and system software components of a physical system and are typically implemented by an extensive virtualization infrastructure, which includes a variety of software and hardware components. Virtualization software layer 115 (e.g., a hypervisor) running on hardware 110 of each host device 105/106/107 manages one or more respective VM's 120-139. Virtualization software layer 115 manages physical resources as well as maintains virtual-to-physical hardware mappings.

Hardware 110 includes ports 140-149 and 191-195. Ports 140-149 and 191-195 are network interfaces used to connect host devices 105-107 to switch 150. As described further herein, connections or links between ports 140-149 and 191-195 and switch 150 may be configured into LAG's 155/160. For example, ports 143, 144, 145, 146, 191, and 192 are illustrated as being included within LAG 155 and ports 140, 141, 148, 149, 194, and 195 are illustrated as being included within LAG 160.

One or more management server(s) 165 is coupled to each host device 105. Management server(s) 165 may be responsible for provisioning and maintaining a multitude of VM's 120-139 on hosts 105-107. Additionally, management server(s) 165 may configure one or more of LAG agent 170, virtual distributed switch 175, and one or more switch agents 180-182 within virtualization software 115 of hosts 105-107.

LAG agent 170 runs within virtualization software layer 115 and receives configuration information from one of management server(s) 165. For example, management server(s) 165 may maintain a mapping, for each host 105-107, between LAG's 155/160 and ports 140-149 and 191-195. LAG agent 170 initiates configuration of LAG's 155/160 within host device 105 based upon the configuration information.

In one embodiment, management server(s) 165 further provide LAG agent 170 with a mapping of VM's 120-139 to LAG's 155/160. For example, VM's 120-139 may be capable of transmitting and/or receiving packets via one or more LAG's. The mapping may indicate which LAG 155/160 a host device 105/106/107 should use when transmitting a packet from a first VM 120-139 to a second VM 120-139. An exemplary mapping includes a source network layer address, a destination network layer address, and a LAG. The mapping will help avoid, e.g., host device 105, on behalf of VM 120, attempting to transmit packets to VM 130 on host device 106 via a first LAG and host device 106, on behalf of VM 130, attempting to transmit packets to VM 120 on host device 105 via the same LAG. Switch 150 views ports within a LAG as a single logical uplink, so attempts by a first host device to transmit a packet received via a LAG to a second host device the switch associates with the same LAG will result in the switch dropping the packet. As used herein, packet refers to a packet or frame of network traffic according to a networking protocol and the terms "packet" and "frame" are used interchangeably.

Additionally, management server(s) 165 may maintain a forwarding/routing table and/or other configuration data for virtual switches in multiple host devices 105. When these virtual switches are centrally managed and configured by management server(s) 165, the individual host-level virtual switches are abstracted into a single large virtual distributed switch 175 that spans multiple hosts at the datacenter level. Virtual distributed switch 175 forwards traffic internally, e.g., between VM 120 and VM 125 within host device 105, or externally, e.g., from VM 135 of host device 106 to VM 137 of host device 107 via ports 145-149 and 191-195.

Management server(s) 165 may also configure switch agents 180-182. As described with reference to FIG. 2, switch agents 180-182 may perform load balancing to distribute traffic between VM's 120-139 internally within each host device 105/106/107. For example, if VM's 120 and 125 were both instances of a web server, switch agent 180 may utilize a load balancing algorithm to determine which of VM 120 and VM 125 is to receive a given packet intended for the web server. Management server(s) 165 may configure and maintain the load balancing algorithm/priorities for switch agents 180-182. Alternatively, switch agents 180-182 utilize a default load balancing algorithm and operates without configuration from management server(s) 165. Additionally, switch agents 180-182 may manage traffic between host devices that share one or more LAG's as will be described with reference to FIGS. 3-8. Management server(s) 165 and/or switch agents 180-182 may configure and maintain a mapping of Internet Protocol (IP) addresses of VM's 120-139 to host devices 105-107, a mapping of media access control (MAC) addresses of synchronization ports 143/147/193 to host devices 105-107, and a mapping of address modifications to packets sent/received via synchronization ports 143/147/193. As used herein, the term MAC address may be used interchangeably with a data link layer address and the term IP address may be used interchangeably with a network layer address.

Figure 2:
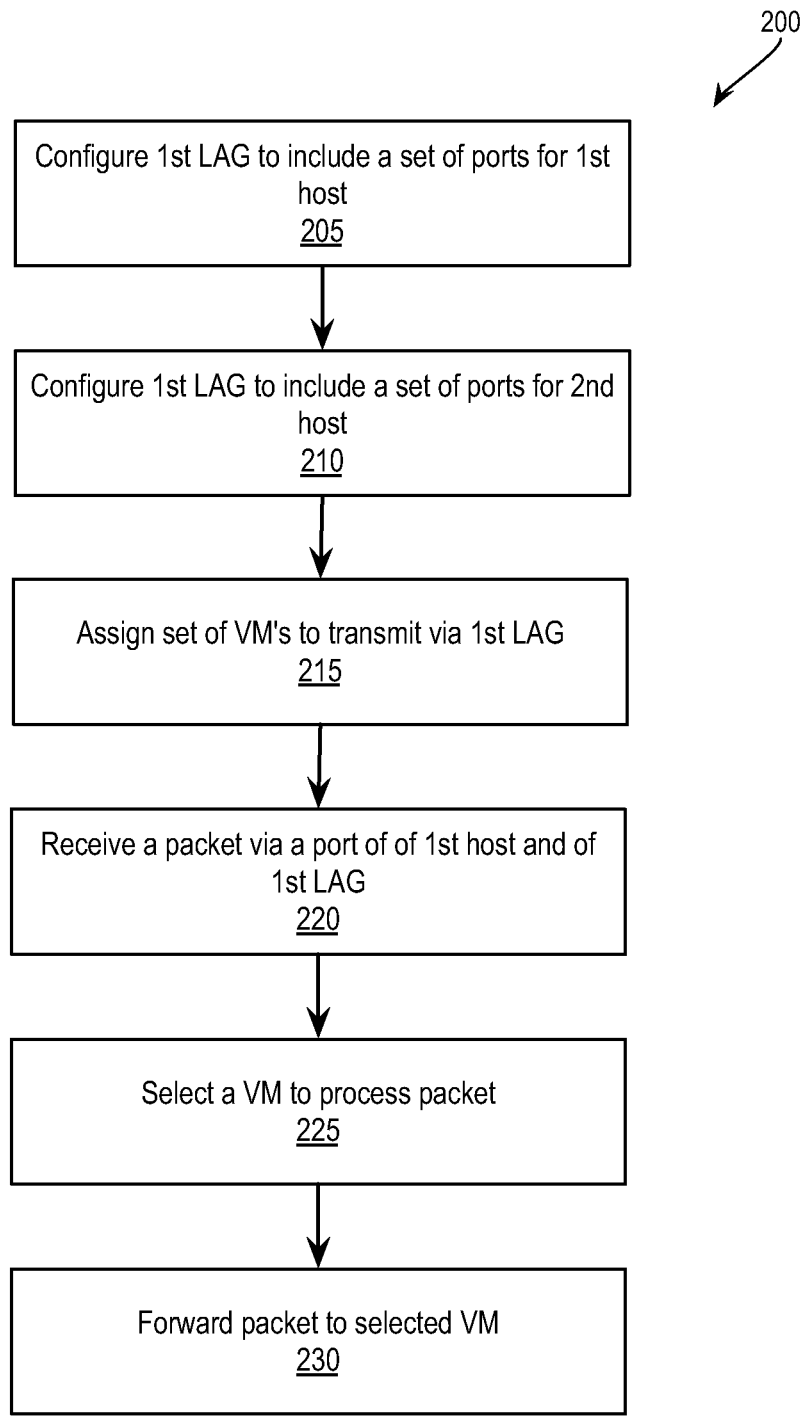
FIG. 2 is a flow chart illustrating an exemplary method of balancing traffic between host devices that share one or more link aggregation groups.

FIG. 2 is a flow chart illustrating an exemplary method 200 of balancing traffic among between host devices that share one or more LAG's. At block 205, host device 105 configures a first set of one or more ports 143-144 to be included within first LAG 155. At block 210, second host device 106 also configures a second set of one or more ports 145-146 to be included within the first LAG 155. For example, the configuration may be implemented via negotiation between host devices 105-106 and switch 150 coupled to first and second sets of ports 143-146. In one embodiment, first LAG 155 is configured according to the Link Aggregation Control Protocol (LACP). LAG agent 170 of each host device 105 sends frames (e.g., LACPDUs) down the links of ports 143-146. Switch 150, on the other end of the links, is enabled to handle LACP and sends frames up the same links. As a result, host devices 105 and switch 150 detect links to combine into a single logical link.

While FIG. 1 illustrates the configuration of first LAG 155 as including two ports of each host device 105 and 106, different numbers of ports may be logically combined into LAG 155. Additionally, as illustrated in FIG. 1, ports 191-192 of host device 107 (as well as ports of another host device) may further be configured to be included within first LAG 155.

As a result of the configuration of first LAG 155, switch 150 performs load balancing between uplinks to ports 143-146 and 191-192 within first LAG 155. For example, when switch 150 receives a packet with a destination address associated with first LAG 155 in a routing table or other data structure maintained by switch 150, switch 150 selects an uplink corresponding to one of ports 143-146 and 191-192 to transmit the packet. In one embodiment, a port within first LAG 155 is selected according based upon a hash of a destination address or identifier, a round robin algorithm, or another load balancing algorithm. In one embodiment, switch 150 is configured to perform load balancing as a part of the negotiation frames exchanged between host devices 105-107 and switch 150. The negotiation may further include selection of a particular load balancing algorithm, e.g., as indicated in frames sent from host device(s) 105-107 to switch 150. Alternatively, switch 150 performs a default load balancing algorithm in response to the configuration of first LAG 155.

At block 215, one or more host devices 105-107 optionally assign a set of one or more VM's 120-139 to first LAG 155. For example, virtual distributed switch 175 may create a mapping between VM's 120-135 and first LAG 155. Additionally, host devices 105, e.g., via LAG agents 170, may assign VM's 120-135 to first LAG 155 in response to instructions or mapping from management server(s) 165 or another configuration of host devices 105. In one embodiment, the assignment of a VM to a LAG for the transmission of a packet is dependent upon the source and destination network layer addresses of the packet. As VM's 120-139 use ports 143-146 and 191-192 within first LAG 155 to transmit packets, switch 150 creates a mapping between address(es)/identifier(s) (e.g., MAC addresses) for VM's 120-139 and first LAG 155.

At block 220, host device 105 receives packet forwarded by switch 150 via first LAG 155. For example, VM 120/125 may have previously transmitted an outgoing packet over port 143 or 144 of first LAG 155 to be forwarded by switch 150 over network(s) 190 to client device 185. Alternatively, VM 130/135 may have previously transmitted the outgoing packet over port 145 or 146 of first LAG 155 or VM 137/139 may have previously transmitted the outgoing packet over port 191 or 192 of first LAG 155. Switch 150, in the process of forwarding the packet, stores a mapping of the source address of the packet to first LAG 155 (rather than the individual uplink to one of ports 143-146 or 191-192). When switch 150 receives an incoming packet, such as a reply from client device 185, switch 150 determines that the destination address of the incoming packet matches the stored source address of the outgoing packet. In response to the determined match, switch 150 forwards the incoming packet via first LAG 155. According to the configured or default load balancing algorithm, switch 150 selects an uplink corresponding to one of ports 143-146 or 191-192 to forward the incoming packet to one of the host devices 105-107. For example, switch 150 may select an uplink to port 144 and forward to the packet to host device 105.

At block 225, host device 105 selects VM 120 or VM 125 to process the received packet. For example, virtual distributed switch 175 may forward the packet to VM 125 based upon the destination IP address (e.g., using a MAC address or an IP address to VM mapping stored within host device 105). In one embodiment, each of a plurality of VM's 120-139 provides the same service and all the plurality of VM's are associated with a common virtual IP address. In another embodiment, a plurality of VM's within a single host device provide the same service and switch agent 180 performs a load balancing algorithm to select a VM to process the packet. For example, switch agent 180 maps the virtual IP address to, e.g., VM's 120-125 and selects VM 125 based upon the load balancing algorithm.

At block 230, virtual distributed switch 175 forwards the received packet to the selected VM. In one embodiment, switch agent 180 replaces the destination MAC address of the packet with the MAC address of the selected VM. In order to route any reply packet(s), virtual distributed switch 175 creates a mapping of the original source and destination address information and the MAC address of the selected VM and forwards the modified packet.

Method 200, or portions thereof, may be repeated to configure additional LAG's. For example, host devices 105-107 may configure addition sets of ports 140, 141, 148, 149, 194, and 195 to be included within second LAG 160. As illustrated, each port within the first LAG 155 is different from ports within second LAG 160.

Figure 3:
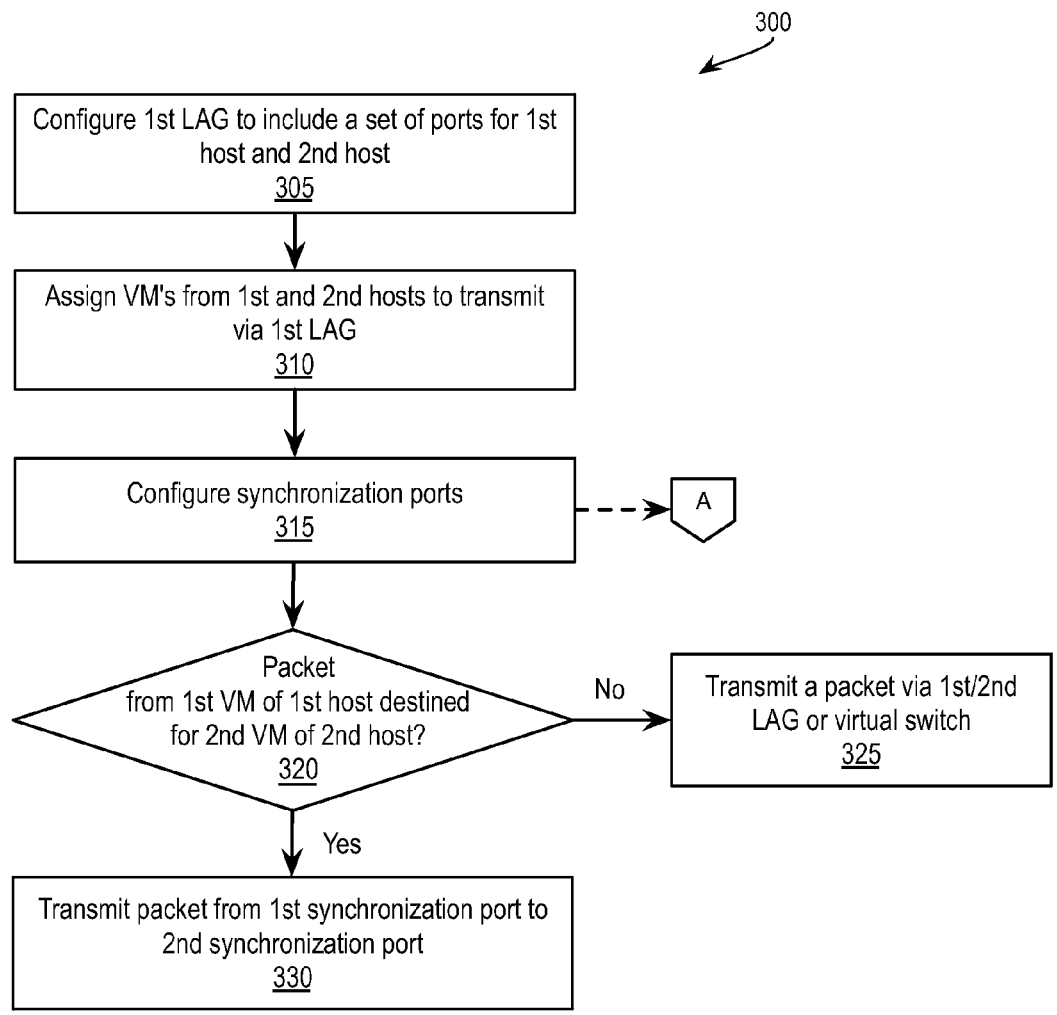
FIG. 3 is a flow chart illustrating an exemplary method of managing outgoing traffic between host devices that share one or more link aggregation groups.

FIG. 3 is a flow chart illustrating an exemplary method 300 of managing outgoing traffic between host devices that share one or more LAG's. At block 305, similar to the description above, host device 105 configures first set of one or more ports 143-144 to be included within first LAG 155 and host device 106 configures a second set of one or more ports 145-146 to also be included within the first LAG 155. Additionally, as illustrated in FIG. 1, ports 191-192 of host device 107 (as well as ports of another host device) may further be configured to be included within first LAG 155.

At block 310, host devices 105-107 optionally assign a set of one or more VM's 120-139 to first LAG 155. Host devices 105-107, via LAG agents 170, may assign VM's 120-139 to first LAG 155 in response to instructions or mapping from management server(s) 165 or another configuration of host devices 105-107. Such a central configuration may facilitate host devices 105-107 using one or more LAG's consistently for transmitting packets to particular destinations. Such a central configuration may also facilitate, e.g., host device 105 being aware of the assignment of VM's 130-139, which are external to host device 105, to first LAG 155.

At block 315, one or more host devices 105-107 configure synchronization port(s) 142, 147, and 193. For example, at least one port of each host device is used as a synchronization port and excluded from sharing a common LAG with any ports of any other host device. Each synchronization port is configured with a unique MAC address, which may be inserted into a packet transmitted by a corresponding host device to indicate the packet is being transmitted between host devices that share one or more LAG's. Additionally, in one embodiment, multiple ports of one host device may assigned to a LAG and collectively serve as a synchronization port/trunk.

The configuration of ports described with reference to blocks 305-315 may be utilized in various embodiments described herein. Rather than repeating the description above, FIG. 3 includes a broken-line connection between block 315 and off-page connector block A. Each of methods 400, 500, 600, and 800 are illustrated as beginning with a similar off-page connector block A to indicate that this configuration portion of method 300 may have already occurred.

At block 320, a first host device (e.g., host device 105) determines if a first packet from a first VM (e.g., VM 120)

within the first host device is to be transmitted to a second VM (e.g., VM 130) on a second host device (e.g., host device 106). In one embodiment, switch agent 180 inspects the destination IP address for the packet and determines that second VM 130 is within the same subnet as first VM 120. Alternatively, the first host device maintains a table or other data structure mapping destination IP addresses to host devices 105-107 that have ports commonly assigned to LAG's. This data structure may be created or maintained as a part of management server(s) 165 configuration of host devices 105-107, as discussed above.

If the packet is destined for another VM within the same host device, at block 325, host device 105 forwards the packet from the first VM via virtual distributed switch 175 to the second VM (e.g., from VM 120 to VM 125). If the packet is destined for an IP address outside of the subnet or otherwise not known as being mapped to a host device sharing a common LAG with host device 105, at block 325, host device 105 forwards the packet via first LAG 155 or second LAG 160 to the external destination (e.g., from VM 120 to client device 185).

If the packet is destined for an IP address for a second VM on a second host device within the subnet or otherwise known as being mapped to a host device sharing a common LAG with the first host device, at block 330, the first host device transmits the packet via a synchronization port (e.g., synchronization port 142 of host device 105) to the synchronization port of the second host device (e.g., synchronization port 147 of host device 106). As described above, first and second synchronization ports 142 and 147 are excluded from first LAG 155 and second LAG 160.

In one embodiment, transmitting the packet from the first synchronization port to the second synchronization port includes replacing one or both of the destination and source addresses for the packet. For example, if the packet's source address were the MAC address for VM 120, switch agent 180 would insert the MAC address for synchronization port 142 as the source MAC address of the packet in the place of the MAC address for VM 120. As discussed above, the MAC address for synchronization port 142 is unique and, therefore, different from the MAC address for VM 120. Additionally, if the packet's destination address were the MAC address for VM 130/135, switch agent 180 would insert the MAC address for synchronization port 147 as the destination MAC address for the packet in the place of the MAC address for VM 130/135. The MAC address for synchronization port 147 is unique and, therefore, different from the MAC address for VM 130/135. In one embodiment, if the packet's destination address were a MAC broadcast address, switch agent 180 would not alter the destination address.

Switch agent 180 would further create a record of the packet modification. In one embodiment, creating such a record includes storing a copy of the original packet's header data. Switch agent 180 may compare header information of a subsequent incoming reply packet to the stored record and direct the reply packet back to the original source, e.g., to VM 120. Management of incoming packets will be further described with reference to FIG. 4.

Figure 4:
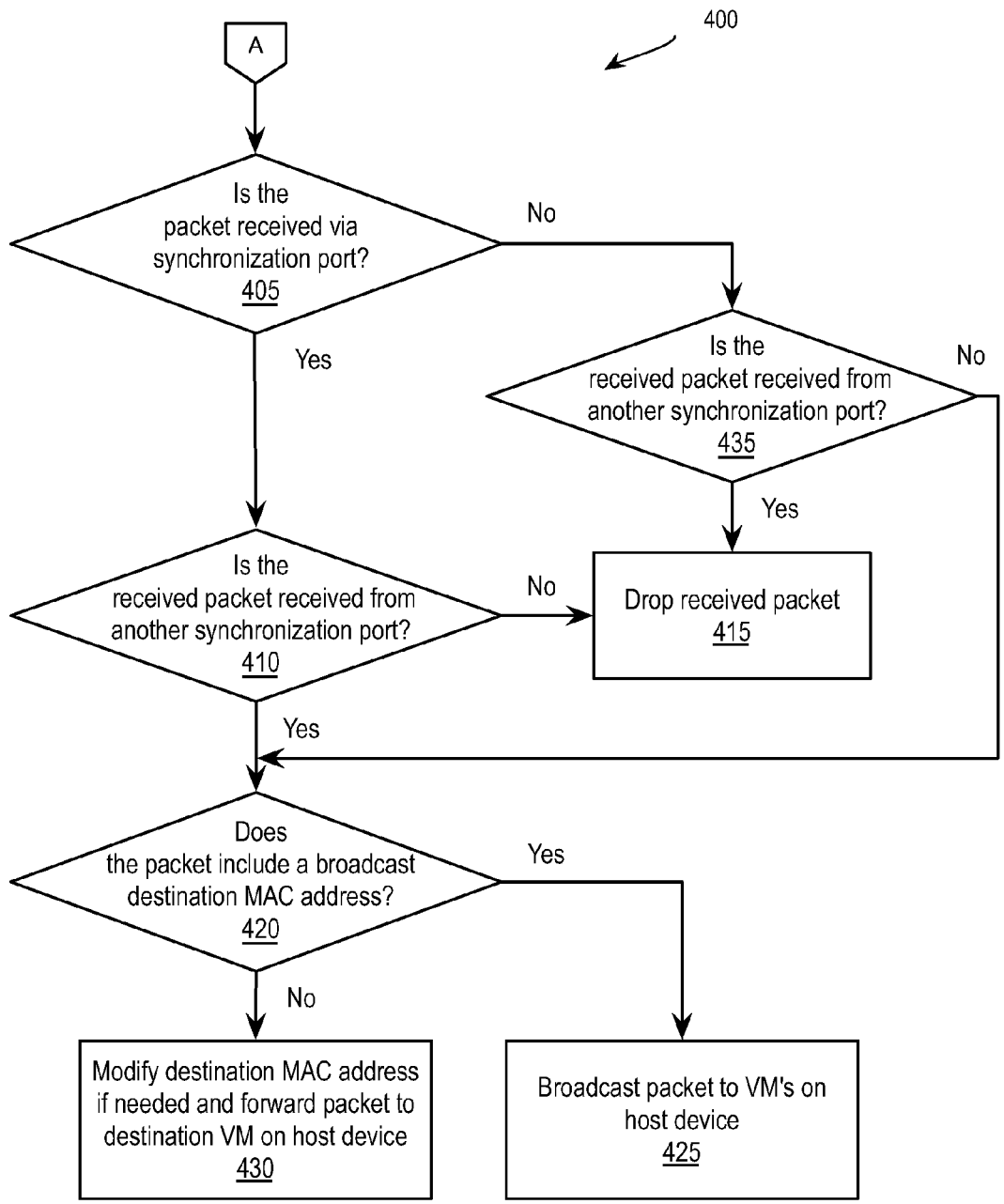
FIG. 4 is a flow chart illustrating an exemplary method of managing incoming traffic between host devices that share one or more link aggregation groups.

FIG. 4 is a flow chart illustrating an exemplary method 400 of managing incoming traffic between host devices that share one or more LAG's. For example, host device 106 may configure its ports as described above with reference to off-page connector A. Upon receipt of a packet, at block 405, the receiving host device determines if the packet was received via the receiving host's synchronization port. For example, if host device 106 receives a packet, switch agent 181 determines if the packet was received via synchronization port 147.

If the receiving host device received the packet via its synchronization port, at block 410, the receiving host device further determines if the packet was received from the synchronization port of another host device. For example, switch agent 181 may use a stored table or other data structure to determine if the source MAC address of the received packet maps to synchronization port 142/193. If the received packet was not received from another synchronization port (e.g., a broadcast packet transmitted via a LAG), at block 415, host device 106 drops the received packet. If the received packet was received from another synchronization port, e.g., if host device 106 received the packet transmitted via synchronization port 142 of host device 105 (as described with reference to FIG. 3), at block 420, host device 106 further determines if the destination MAC address of the received packet is set to a broadcast destination address.

If the destination MAC address of the received packet is set to a broadcast destination address, at block 425, host device 106 broadcasts the packet to VM's 130-135 on host device 106. Alternatively, if the destination MAC address of the received packet is for an individual VM 130/135 on host device 106, at block 430, host device 106 modifies the packet to replace the packet destination MAC address for synchronization port 147 with the MAC address for the destination VM on host device 106. For example, host device 106 may use the destination IP address of the received packet to look up the MAC address for the destination VM 130/135 in a table or other data structure, replace the destination MAC address accordingly, and forward the packet to VM 130/135.

In one embodiment, switch agent 181 creates a record of the packet modification. Creating such a record includes storing a copy of the original packet's header data. Switch agent 180 may compare header information of a subsequent reply packet from VM 130/135 to the stored record and direct the reply packet back, e.g., to VM 120 via synchronization ports 147 and 142.

Continuing with the example above, a reply packet sent by host device 106 on behalf of VM 130/135 would include a destination MAC address for synchronization port 142, a destination IP address for VM 120, a source MAC address for synchronization port 147 (e.g., as modified by switch agent 180 of host 106 in response to the stored record of the previously modified packet), and a source IP address for VM 130/135. Host device 105, at block 405, receives the reply packet via synchronization port 142. Host device 105, at block 410, determines the reply packet was received from synchronization port 147. Host device 105, at block 420, further determines that the destination MAC address is not a broadcast. Host device 105, at block 430, determines that the reply packet is destined for VM 120 based upon the destination IP address, modifies the destination MAC address to VM 120's MAC address, and forwards the reply packet to VM 120.

If the receiving host device did not receive the packet via its synchronization port, at block 435, the receiving host device determines if the packet was received from the synchronization port of another host device. If the packet was received from the synchronization port of another host device, at block 415, the receiving host device drops the received packet. For example, host device 106 may receive a broadcast packet from host device 105 via one of ports 148-149 of LAG 160. Given the broadcast packet was transmitted via synchronization port 142, host device 106 would drop packet received via LAG 160. Such a packet would be duplicative of the broadcast packet received via synchronization port 147.

If the packet was not received from the synchronization port of another host device, at block 415, the receiving host device may forward or broadcast the packet at blocks 420-430, as described above. For example, if the packet were received by host device 106 via LAG 160 from client device 185, the packet would be forwarded to the corresponding VM 130/135.

Figure 5:
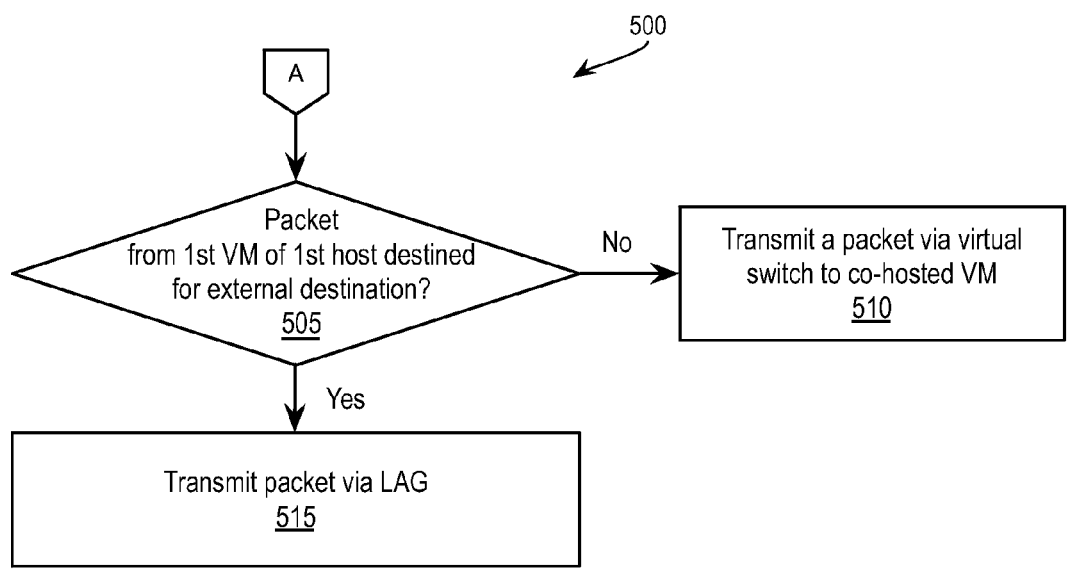
FIG. 5 is a flow chart illustrating another exemplary method of managing outgoing traffic between host devices that share one or more link aggregation groups.

FIG. 5 is a flow chart illustrating another exemplary method 500 of managing outgoing traffic between host devices that share one or more LAG's. Similar to method 300, host device 105 may configure its ports as described above with reference to off-page connector A. In contrast to method 300, at block 505, host device 105 determines if a packet from a first VM (e.g., VM 120) is to be transmitted to a destination external to host device 105. If not, at block 510, the packet is forwarded via virtual distributed switch 175 to the co-hosted VM (e.g., VM 125). If the packet's destination is external to host device, at block 515, host device 105 transmits the packet via a LAG 155/160.

Method 500 allows host devices to attempt to transmit packets via one or more LAG's prior to relying upon a synchronization port. If the attempt to transmit a packet within a subnet of host devices sharing common LAG's fails, the receiving device may redirect the packet as described with reference to FIGS. 6-8. Management server(s) 165 may configure host devices 105-107 to utilize one or both of methods 300 and 500 to transmit packets. In one embodiment, host devices 105-107 determine whether to utilize method 300 or method 500 based upon the amount of traffic transmitted between host devices 105-107 that share one or more LAG's 155/160 and the bandwidth of the synchronization port(s) 142/147/193. As described above, each host device 105-107 may include multiple synchronization ports, which may be configured into a separate LAG. A LAG including synchronization ports would only include synchronization ports from a single host device. Host devices 105-107 may determine whether to utilize method 300 or 500 based upon a threshold number of packets transmitted via each synchronization port. For example, packet levels above the threshold may indicate whether transmitting all traffic transmitted between host devices 105-107 via synchronization ports would suffer choke point(s) in the synchronization port(s) 142/147/193.

Figure 6:
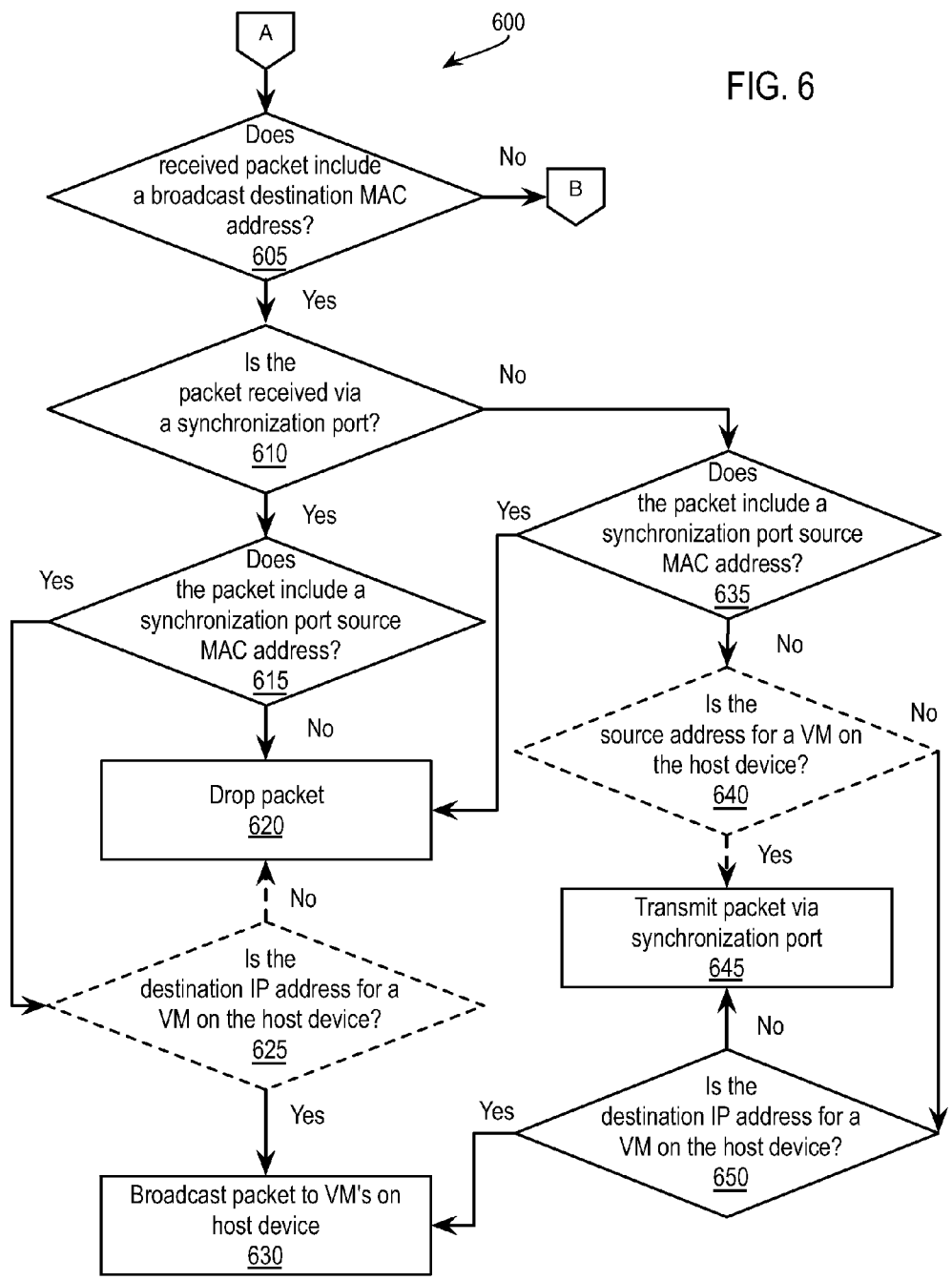
FIG. 6 is a flow chart illustrating another exemplary method of managing incoming traffic between host devices that share one or more link aggregation groups.

FIG. 6 is a flow chart illustrating another exemplary method 600 of managing incoming traffic between host devices that share one or more LAG's. For a packet transmitted between host devices that share multiple LAG's, the packet may be transmitted from a first host device via a first LAG to switch 150. Switch 150 determines that the packet is destined for a VM on a second host device that is associated with a second LAG. In performing load balancing between host devices that share the second LAG, it is possible that the packet will be delivered to back to the first host device, to the second host device as intended, or to yet another host device. Method 600 enables host devices to determine if a received packet failed to reach the intended destination. Packets that fail to reach an intended destination via common LAG's are redirected via a synchronization port.

As described above, one or more host devices may configure its ports as described above with reference to off-page connector A. At block 605, the host device receiving a packet determines if a received packet includes a broadcast destination MAC address. If the received packet includes a unicast destination MAC address, method 600 continues in FIG. 7 as indicated by off-page connector B. If the received packet includes a broadcast destination MAC address, at block 610, the host device determines if the packet was received via (one of) the host device's synchronization port(s).

If the received packet was received via (one of) the host device's synchronization port(s), at block 615, the host device determines if the packet's source MAC address is a synchronization port MAC address. For example, as described herein, a transmitting synchronization port replaces a packet's source MAC address with its own MAC address to indicate that the packet was transmitted via a synchronization port. If the packet's source is not a synchronization port MAC address, at block 620, the host device drops the packet. For example, a broadcast packet received by host device 106 via synchronization port 147, and transmitted by host device 105 via LAG 155, would be dropped.

Otherwise, at block 625, the host device optionally determines if the destination IP address of the received packet is for a VM running on the host device. If the received packet is not destined for a VM on the host device, at block 620, the host device drops the packet. For example, a broadcast packet received by host device 106 via synchronization port 147, transmitted by host device 105 via synchronization port 142, and including a destination IP address for VM 137/139 would be dropped.

If the packet is destined for a VM on the host device, at block 630, the host device broadcasts the packet to VM's on the host device. For example, a broadcast packet received by host device 106 via synchronization port 147, transmitted by host device 105 via synchronization port 142, and including a destination IP address for VM 130/135 would be broadcast to VM's 130-135. Alternatively, the host broadcasts the packet to VM's on the host device without determining whether or not the packet is destined for a VM running on the host device. For example, a broadcast packet received by host device 106, via synchronization port 147, and transmitted by host device 105 via synchronization port 142, would be broadcast to VM's 130-135 regardless of destination IP address.

Returning to the determination of block 610, if the received packet was not received via (one of) the host device's synchronization port(s), at block 635, the host device determines if the packet's source MAC address is a synchronization port MAC address. If the packet's source is a synchronization port MAC address, at block 620, the host device drops the packet. For example, a broadcast packet received by host device 106 via LAG 155/160, transmitted by host device 105 via synchronization port 142, would be dropped.

Otherwise, at block 640, the host device optionally determines if the source MAC or IP address is a MAC or IP address of a VM or port of the host device. For example, if host device 105 transmitted a broadcast packet via LAG 155, switch 150 will forward the packet to a host device via LAG 160. In performing load balancing between the uplinks of LAG 160, switch 150 may forward the packet back to host device 105.

If the source MAC or IP address is for a VM or port of the host device, at block 645, the host device transmits the packet via a synchronization port, e.g., as described above with reference to block 330 of FIG. 3. If the source MAC or IP address is not a for a VM or port of the host device, or if block 640 is skipped, at block 640, the host device determines if the destination IP address of the received packet is for a VM running on the host device. If so, at block 630, the host device broadcasts the packet to VM's on the host device. For example, a broadcast packet received by host device 106 via LAG 160, transmitted by host device 105 via LAG 155, and including a destination IP address for VM 130/135 would be broadcast to VM's 130-135. Otherwise, at block 645, the host device transmits the packet via a synchronization port, e.g., as described above with reference to block 330. For example, a broadcast packet received by host device 106 via LAG 160, transmitted by host device 105 via LAG 155, and including a destination IP address for VM 137/139 would be broadcast via synchronization port 147 and switch 150 to other host device synchronization ports.

Figure 7:
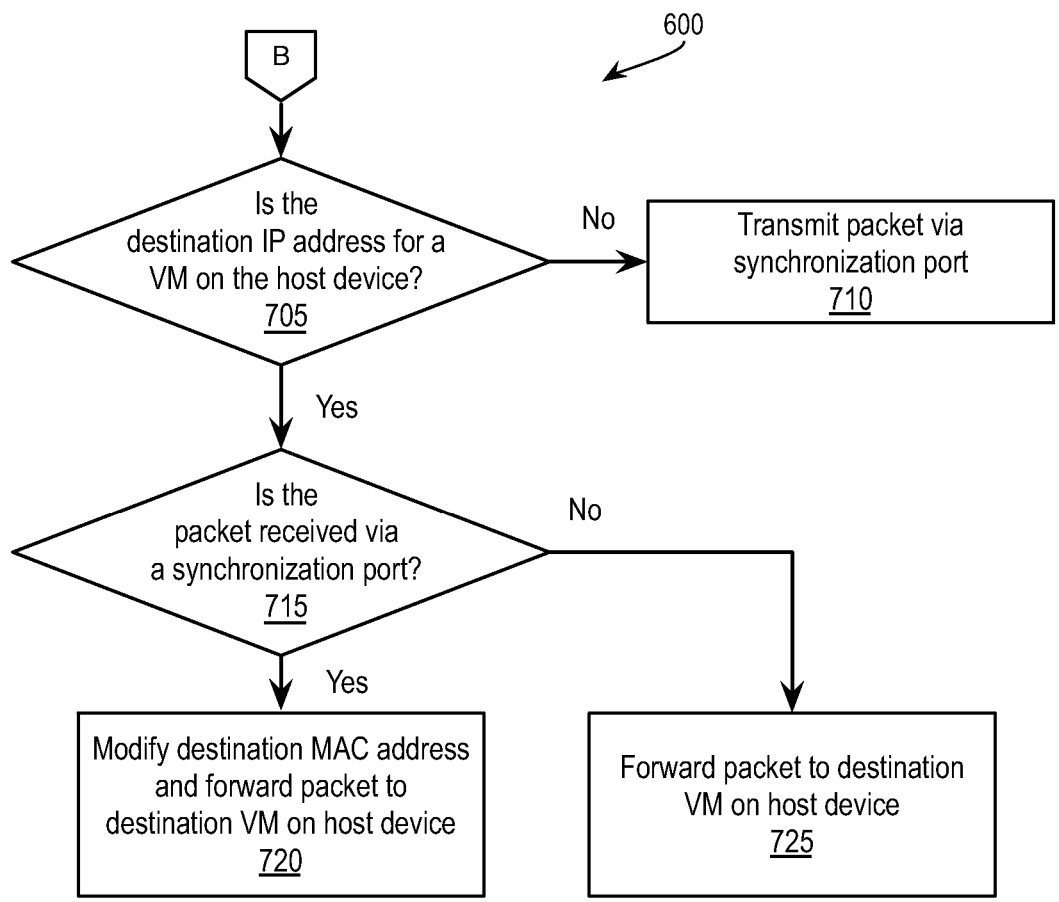
FIG. 7 is a continuation of the flow chart FIG. 6.

FIG. 7 is a continuation of the flow chart FIG. 6. If the received packet includes a unicast destination MAC address, as described above, method 600 continues at off-page connector B. At block 705, the host device determines if the destination IP address of the received packet is for a VM running on the host device. If not, at block 710, the host device transmits the packet via a synchronization port, e.g., as described above with reference to block 330. For example, a unicast packet received by host device 106 and including a destination IP address for VM 137/139 would be transmitted via synchronization port 147 to synchronization port 193.

Otherwise, at block 715, the host device determines if the received packet was received via (one of) the host device's synchronization port(s). If so, at block 720, the host device modifies the received packet to replace the packet destination MAC address for the synchronization port with the MAC address for the destination VM on the host device and forwards the packet to the destination VM. For example, a unicast packet received by host device 106 via synchronization port 147 and including a destination IP address for VM 130/135 would modified to replace the synchronization port 147 destination MAC address with the MAC address for VM 130/135 and the modified packet would be forwarded to VM 130/135.

Otherwise, at block 725, forwards the packet to the destination VM without modifying the destination MAC address. For example, a unicast packet received by host device 106 via synchronization port 147, including a destination MAC address and a destination IP address for VM 130/135 would be forwarded to VM 130/135.

Figure 8:
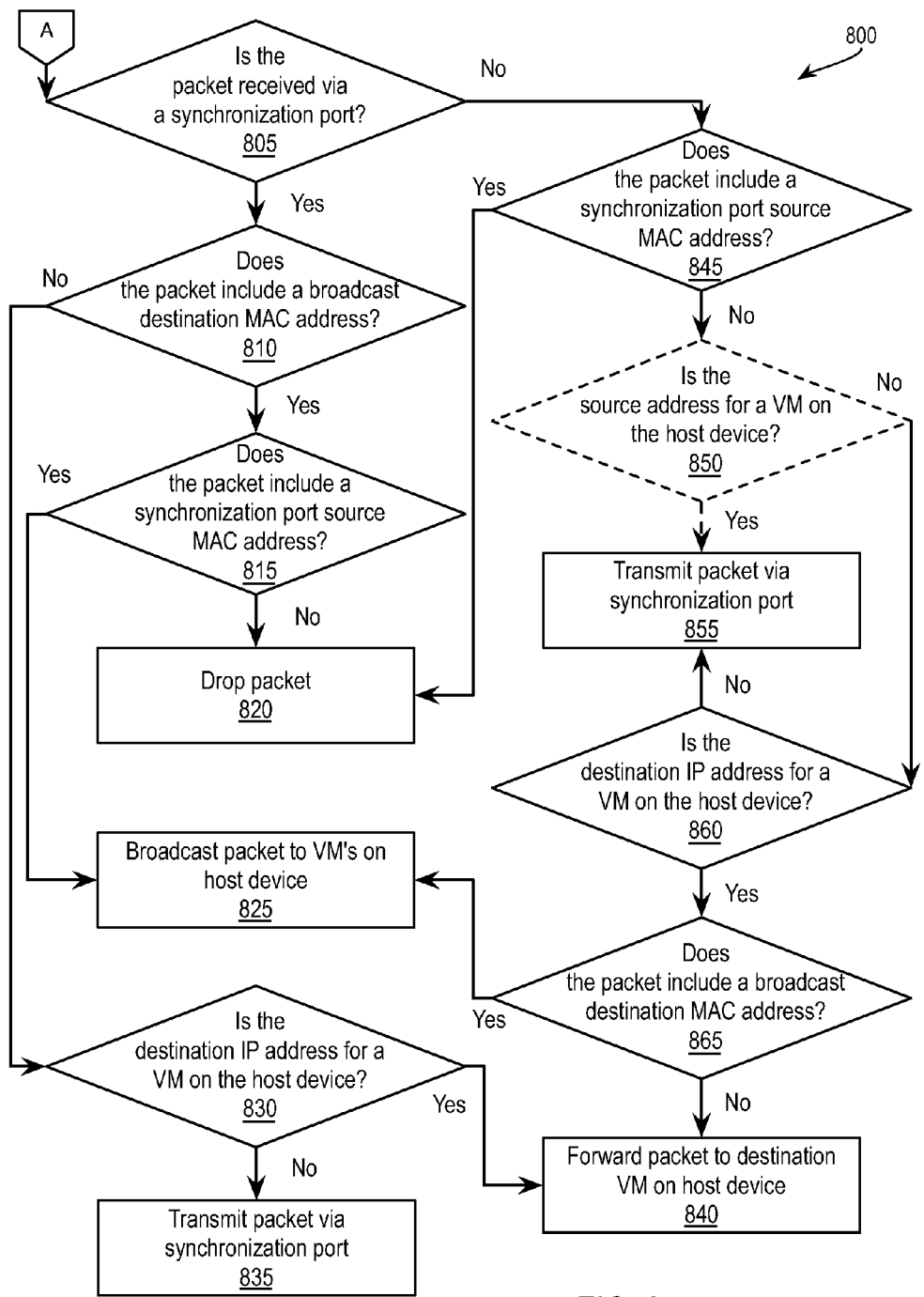
FIG. 8 is a flow chart illustrating yet another exemplary method of managing incoming traffic between host devices that share one or more link aggregation groups.

FIG. 8 is a flow chart illustrating yet another exemplary method 800 of managing incoming traffic between host devices that share one or more LAG's. A host device may perform blocks of method 600 in a different order while managing incoming traffic between host devices that share one or more LAG's in a similar manner. Method 800 is one example of performing said blocks in another order. While the order of the flow has changed, the features of each individual block has been described with reference to FIGS. 6-7 and will not be repeated here.

Figure 9:
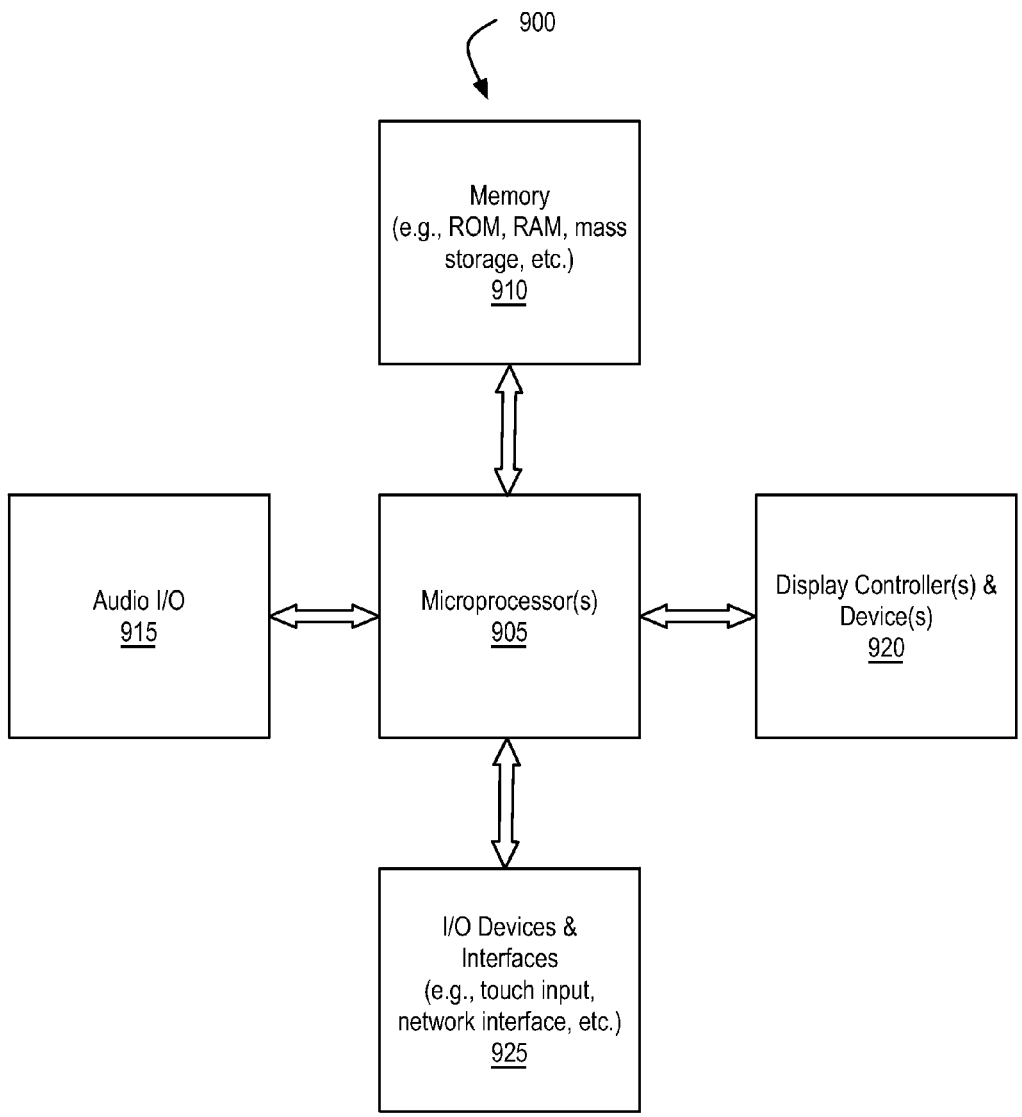
FIG. 9 illustrates, in block diagram form, an exemplary processing system to perform load balancing traffic among and managing traffic between host devices that share one or more link aggregation groups.

FIG. 9 illustrates, in block diagram form, an exemplary processing system 900 to perform load balancing traffic among and managing traffic between virtual machines within a single LAG. Data processing system 900 includes one or more microprocessors 905 and connected system components (e.g., multiple connected chips). Alternatively, data processing system 900 is a system on a chip.

Data processing system 900 includes memory 910, which is coupled to microprocessor(s) 905. Memory 910 may be used for storing data, metadata, and programs for execution by the microprocessor(s) 905. Memory 910 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 910 may be internal or distributed memory.

Data processing system 900 also includes audio input/output subsystem 915 which may include a microphone and/or a speaker for, for example, playing back music or other audio, receiving voice instructions to be executed by microprocessor(s) 905, playing audio notifications, etc. Display controller and display device 920 provides a visual user interface for the user.

Data processing system 900 also includes one or more input or output ("I/O") devices and interfaces 925, which are provided to allow a user to provide input to, receive output from, and otherwise transfer data to and from the system. I/O devices 925 may include a mouse, keypad or a keyboard, a touch panel or a multi-touch input panel, camera, optical scanner, network interface, modem, other known I/O devices or a combination of such I/O devices.

I/O devices and interfaces 925 may also include a port, connector for a dock, or a connector for a USB interface, FireWire, Thunderbolt, Ethernet, Fibre Channel, etc. to connect the system 900 with another device, external component, or a network. Exemplary I/O devices and interfaces 925 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 900 with another device, external component, or a network and receive stored instructions, data, tokens, etc.

It will be appreciated that one or more buses, may be used to interconnect the various components shown in FIG. 9.

Data processing system 900 is an exemplary representation of one or more of the hosts 105, management server(s) 165, and client device 185 described above. Data processing system 900 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 900 may be a network computer, server, or an embedded processing device within another device or consumer electronic product. As used herein, the terms computer, device, system, processing system, processing device, and "apparatus comprising a processing device" may be used interchangeably with data processing system 900 and include the above-listed exemplary embodiments.

It will be appreciated that additional components, not shown, may also be part of data processing system 900, and, in certain embodiments, fewer components than that shown in FIG. 9 may also be used in data processing system 900. It will be apparent from this description that aspects of the inventions may be embodied, at least in part, in software. That is, the computer-implemented methods 200, 300, 400, 500, 600, and 800 may be carried out in a computer system or other data processing system 900 in response to its processor or processing system 905 executing sequences of instructions contained in a memory, such as memory 910 or other non-transitory machine-readable storage medium. The software may further be transmitted or received over a network (not shown) via network interface device 925. In various embodiments, hardwired circuitry may be used in combination with the software instructions to implement the present embodiments. Thus, the techniques are not limited to any specific combination of hardware circuitry and software, or to any particular source for the instructions executed by data processing system 900.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method of load balancing across a plurality of host devices, the method comprising:
    configuring, via negotiation by a first host device with a switch coupled to a first set of one or more ports of the first host device, the first set of ports to be included within a first link aggregation group (LAG);
    configuring, via negotiation by a second host device with the switch, a second set of one or more ports of the second host device to also be included within the first LAG, wherein the second set of ports are coupled to the switch, and wherein the configuration of the first LAG includes the switch performing load balancing between uplinks to ports within the first LAG; and
    receiving, by the first host device via the first LAG, a packet to be processed by one of a first plurality of virtual machines running on the first host device or one of a second plurality of virtual machines running on the second host device, a first virtual machine of the first and second pluralities of virtual machines implementing a service to process the packet and each other virtual machine of the first and second pluralities of virtual machines also implementing the service to process the packet, wherein the first host device receives the packet as a result of the switch selecting an uplink to a port within the first and second sets of ports based upon the load balancing between the ports within the first LAG, and wherein the packet is addressed to a destination address, and the destination address is a common address assigned to each virtual machine of the first plurality of virtual machines and each virtual machine of the second plurality of virtual machines.

2. The computer-implemented method of claim 1, wherein a plurality of the virtual machines running on the first host device implement the service, further comprising:
    selecting one of the first plurality of virtual machines to receive the packet, the selection based upon load balancing performed by virtualization software of the first host device; and
    delivering the packet to the selected virtual machine.

3. The computer-implemented method of claim 1, further comprising:
    assigning the first plurality virtual machines running on the first host device to the first LAG, wherein a second plurality virtual machines running on the second host device is also assigned to the first LAG.

4. The computer-implemented method of claim 1, further comprising:
    configuring a third set of one or more ports of the first host device to be included within a second LAG, wherein a fourth set of one or more ports of the second host device is also included within the second LAG, each port within the first set of ports being different from ports within the third set of ports and each port within the second set of ports being different from ports within the fourth set of ports.

5. The computer-implemented method of claim 1, wherein the destination address is a virtual network layer address associated with the first and second pluralities of virtual machines.

6. The computer-implemented method of claim 5, wherein delivering the packet to the selected virtual machine includes modifying the destination address of the packet.

7. A non-transitory computer-readable medium storing instructions, which when executed by a management server, cause the management server to configure a first host device and a second host device to perform a method comprising:
    configuring, via negotiation by the first host device with a switch coupled to a first set of one or more ports of the first host device, the first set of ports to be included within a first link aggregation group (LAG);
    configuring, via negotiation by the second host device with the switch, a second set of one or more ports of the second host device to also be included within the first LAG, wherein the second set of ports are coupled to the switch, and wherein the configuration of the first LAG includes the switch performing load balancing between uplinks to ports within the first LAG; and
    receiving, by the first host device via the first LAG, a packet to be processed by one of a first plurality of virtual machines running on the first host device or one of a second plurality of virtual machines running on the second host device, a first virtual machine of the first and second pluralities of virtual machines implementing a service to process the packet and each other virtual machine of the first and second pluralities of virtual machines also implementing the service to process the packet, wherein the first host device receives the packet as a result of the switch selecting an uplink to a port within the first and second sets of ports based upon the load balancing between the ports within the first LAG, and wherein the packet is addressed to a destination address, and the destination address is a common address assigned to each virtual machine of the first plurality of virtual machines and each virtual machine of the second plurality of virtual machines.

8. The non-transitory computer-readable medium of claim 7, wherein a plurality of the virtual machines running on the first host device implement the service, the method further comprising:
   selecting one of the first plurality of virtual machines to receive the packet, the selection based upon load balancing performed by virtualization software of the first host device; and
   delivering the packet to the selected virtual machine.

9. The non-transitory computer-readable medium of claim 7, the method further comprising:
   assigning the first plurality virtual machines running on the first host device to the first LAG, wherein a second plurality virtual machines running on the second host device is also assigned to the first LAG.

10. The non-transitory computer-readable medium of claim 7, the method further comprising:
   configuring a third set of one or more ports of the first host device to be included within a second LAG, wherein a fourth set of one or more ports of the second host device is also included within the second LAG, each port within the first set of ports being different from ports within the third set of ports and each port within the second set of ports being different from ports within the fourth set of ports.

11. The non-transitory computer-readable medium of claim 7, wherein the destination address is a virtual network layer address associated with the first and second pluralities of virtual machines.

12. The non-transitory computer-readable medium of claim 11, wherein delivering the packet to the selected virtual machine includes modifying the destination address of the packet.

13. A system comprising:
   a first host device including a first processing device, wherein the first processing device executes instructions that cause the first host device to perform a method comprising:
      configuring, via negotiation by the first host device with a switch coupled to a first set of one or more ports of the first host device, the first set of ports to be included within a first link aggregation group (LAG); and
   a second host device including a second processing device, wherein the second processing device executes instructions that cause the second host device to perform a method comprising:
      configuring, via negotiation by a second host device with the switch, a second set of one or more ports of a second host device to also be included within the first LAG, wherein the second set of ports are coupled to the switch, and wherein the configuration of the first LAG includes the switch performing load balancing between uplinks to ports within the first LAG; and
   receiving, by the second host device via the first LAG, a packet to be processed by one of a first plurality of virtual machines running on the first host device or one of a second plurality of virtual machines running on the second host device, a first virtual machine of the first and second pluralities of virtual machines implementing a service to process the packet and each other virtual machine of the first and second pluralities of virtual machines also implementing the service to process the packet, wherein the first host device receives the packet as a result of the switch selecting an uplink to a port within the first and second sets of ports based upon the load balancing between the ports within the first LAG, and wherein the packet is addressed to a destination address, and the destination address is a common address assigned to each virtual machine of the first plurality of virtual machines and each virtual machine of the second plurality of virtual machines.

14. The system of claim 13, wherein a plurality of the virtual machines running on the second host device implement the service, wherein the second host device selects one of the first plurality of virtual machines to receive the packet, the selection based upon load balancing performed by virtualization software of the second host device, and wherein the second host device delivers the packet to the selected virtual machine.

15. The system of claim 13, the method further comprising:
   assigning the first plurality virtual machines running on the first host device to the first LAG; and
   assigning the second plurality virtual machines running on the second host device to the first LAG.

16. The system of claim 13, the method further comprising:
   configuring, by the first host device, a third set of one or more ports of the first host device to be included within a second LAG; and
   configuring, by the second host device, a fourth set of one or more ports of the second host device to also be included within the second LAG, each port within the first set of ports being different from ports within the third set of ports and each port within the second set of ports being different from ports within the fourth set of ports.

17. The system of claim 13, wherein the destination address is a virtual network layer address associated with the first and second pluralities of virtual machines.

* * * * *